2 Sheets--Sheet 1.
J. CURTS.
Water Elevator.
No. 133,208. Patented Nov. 19, 1872.
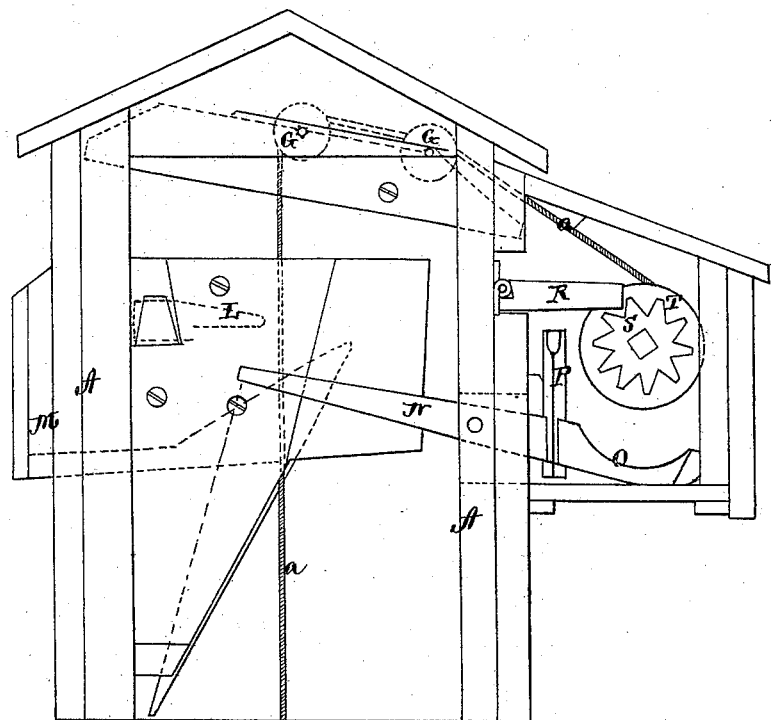
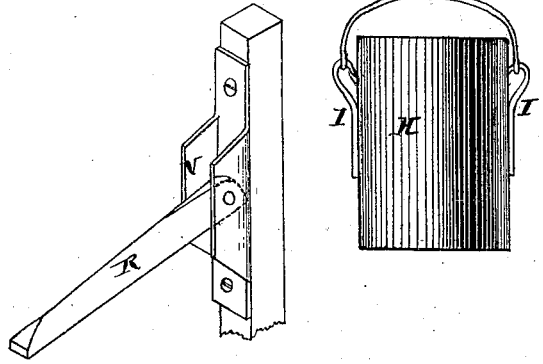
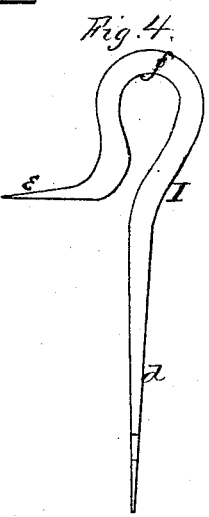
Witnesses:
Franck L. Durand
C. L. Evert
Inventor.
James Curts,
per Alexander Mason
Attorneys.

J. CURTS.
Water Elevator.
No. 133,208.   Fig. 2.   Patented Nov. 19, 1872.
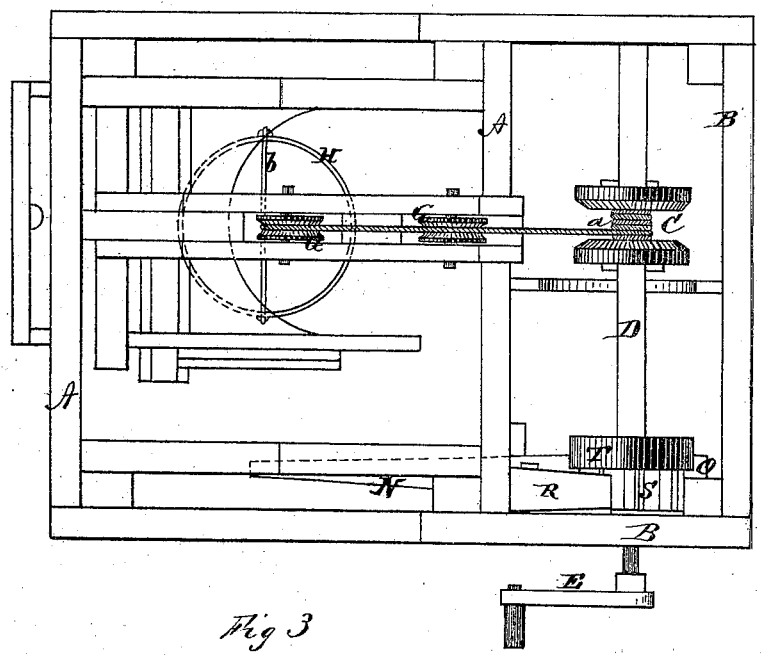
Fig. 3
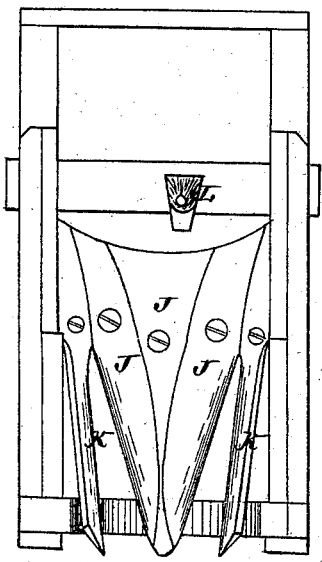
Witnesses:  
Franck L. Durand  
C. L. Evert.
Inventor.  
James Curts,  
per Alexander Mason  
Attorneys.

UNITED STATES PATENT OFFICE.

JAMES CURTS, OF OTTUMWA, IOWA.

IMPROVEMENT IN WATER-ELEVATORS.

Specification forming part of Letters Patent No. 133,208, dated November 19, 1872.

*To all whom it may concern:*

Be it known that I, JAMES CURTS, of Ottumwa, in the county of Wapello and in the State of Iowa, have invented certain new and useful Improvements in Water-Elevator; and do hereby declare that the following is a full, clear, and exact description thereof, reference being had to the accompanying drawing and to the letters of reference marked thereon making a part of this specification.

The nature of my invention consists in the construction and arrangement of a well-curb and elevator for drawing water from wells, as will be hereinafter more fully set forth.

In order to enable others skilled in the art to which my invention appertains to make and use the same, I will now proceed to describe its construction and operation, referring to the annexed drawing, in which—

Figure 1 is a side view of my well-curb with the side removed, showing the interior of the same and the water-elevator; Fig. 2 is a plan view of the same with the top removed; Fig. 3 is a front view of the bucket-guide; Fig. 4 is an enlarged side view of the ear on the bucket to which the bail is attached; and Fig. 5 is a perspective view of the pawl of the windlass.

A represents the usual well-house or well-curb, on the rear side of which is an additional curb, B, containing the windlass C for raising the water. This windlass is placed on a shaft, D, turned by a crank, E, at its end, and from said windlass a rope or chain, a, passes up over and around two pulleys, G G, arranged in the top of the well-house A. The rope a then passes downward, and is attached to the bail of the well-bucket. This arrangement is used particularly when the point of delivery is above the windlass, as, it will readily be seen, the spout and pulleys may be raised to any desired height. When the point of delivery or spout is below the windlass only one pulley, G, is required, instead of two. The rope a is attached to the bail b, and this bail is fastened in ears I I on the well-bucket H. These ears are constructed as shown in Fig. 4, each being made in one piece, with the lower end d straight. From this straight end a hook or loop, f, is formed, bent outward, and the other end, e, is pointed inward, and stands at right angles with the straight end d. This pointed end e is forced into the bucket, and the straight end d is secured by screws or their equivalents to the side of the bucket. The object of this form of the ears I is to keep the bail b from the bucket, so that it will not touch the sides thereof. Within the main well-curb A is the bucket-guide, consisting of three inclined V-shaped slats, J J, which are raised or convex at their lower ends, and with a straight slat, K, on each side of the same. When the bucket is drawn up it strikes the raised or convex surface on the slats J J, glances off, and, as the bucket is drawn still further up, it squares it around until it strikes the bar L above the bucket-guide. This bar tips the bucket and causes it to empty in the spout M. In the main curb A is pivoted a lever, N, one end of which extends into the rear curb B, and forms the brake O. To this lever, within the curb B, is attached a bar, P, by means of which a pawl, R, is raised from off the ratchet-wheel S on the shaft D. At the same time, as the pawl R is raised from the ratchet-wheel, the brake O is brought in contact with the edge of a wheel, T, also secured on the shaft D, thus preventing the too rapid descent of the bucket. The rear end of the pawl R is rounded on top, so that it will work up and down in the hinge V, as shown in Fig. 5, while it is square on the under side to fit square against the hinge, the hinge to be attached to one of the posts of the curbs.

Having thus fully described my invention, what I claim as new, and desire to secure by Letters Patent, is—

1. The bucket-guide, consisting of the three V-shaped slats J J, having their lower ends convex or raised, and with one straight slat, K, on each side thereof, substantially as herein set forth.

2. The bucket-ear I, constructed as described, with straight end d, loop or hook f, and pointed end e, substantially as and for purposes herein set forth.

3. The arrangement of the well-curb A, side curb B, windlass C, rope a, pulley or pulleys G, bucket H, guide J K, lever N, brake O, bar P, pawl R, ratchet-wheel S, and wheel T, all constructed substantially as and for the purposes herein set forth.

In testimony that I claim the foregoing I have hereunto set my hand this 8th day of May, 1872.

JAMES CURTS.

Witnesses:
CHAS. F. VATTERLIN,
H. P. GRAVES.